(12) United States Patent
Vallet et al.

(10) Patent No.: US 10,767,750 B2
(45) Date of Patent: Sep. 8, 2020

(54) HOLLOW-SHAFT LUBRICATING DEVICE, AND TRANSMISSION COMPRISING A STATIONARY FEEDING CANNULA

(71) Applicant: Nissan Motor Co., Ltd., Yokohama-shi, Kanagawa (JP)

(72) Inventors: François-Xavier Vallet, Boulogne Billancourt (FR); Flavien Villiers, Villiers sur Orge (FR)

(73) Assignee: Nissan Motor Co., Ltd., Yokohama (JP)

( * ) Notice: Subject to any disclaimer, the term of this patent is extended or adjusted under 35 U.S.C. 154(b) by 201 days.

(21) Appl. No.: 16/082,953

(22) PCT Filed: Feb. 2, 2017

(86) PCT No.: PCT/FR2017/050227
§ 371 (c)(1),
(2) Date: Sep. 7, 2018

(87) PCT Pub. No.: WO2017/153647
PCT Pub. Date: Sep. 14, 2017

(65) Prior Publication Data
US 2019/0093753 A1 Mar. 28, 2019

(30) Foreign Application Priority Data
Mar. 10, 2016 (FR) ..................... 16 52013

(51) Int. Cl.
*F16H 57/04* (2010.01)

(52) U.S. Cl.
CPC ....... *F16H 57/0426* (2013.01); *F16H 57/043* (2013.01)

(58) Field of Classification Search
CPC . F16H 57/0426; F16H 57/043; F15H 57/0426
See application file for complete search history.

(56) References Cited

U.S. PATENT DOCUMENTS 3,834,248 A * 9/1974 Caliri .................... F16F 15/162
74/443
4,368,802 A * 1/1983 Grabill .................. F16H 57/043
184/6.12

(Continued)

FOREIGN PATENT DOCUMENTS

EP 0448457 A1 * 9/1991 ............ F16D 23/06
FR 2877065 A1 4/2006

(Continued)

*Primary Examiner* — Sherry L Estremsky
(74) *Attorney, Agent, or Firm* — Global IP Counselors, LLP

(57) ABSTRACT

A hollow shaft lubricating system is provided for lubricating a transmission through a hollow shaft inside a transmission case of the transmission. The hollow shaft lubricating system includes a stationary feeding cannula that extends inside the hollow shaft towards specific lubrication points in the transmission. The hollow shaft lubricating system further includes an external lubrication circuit in fluid communication with an opening in the transmission case. The stationary feeding cannula has a cannula inlet that receives the oil from the external lubrication circuit through the opening in the transmission case.

10 Claims, 3 Drawing Sheets

(56) References Cited

U.S. PATENT DOCUMENTS

| | | | | |
|---|---|---|---|---|
| 4,501,167 A | * | 2/1985 | Saito | F16H 57/02 |
| | | | | 184/6.12 |
| 9,086,133 B2 | * | 7/2015 | Tanaka | F16H 57/043 |
| 9,982,770 B2 | * | 5/2018 | Galab | F16H 57/0426 |
| 2009/0221391 A1 | | 9/2009 | Bazyn et al. | |
| 2018/0274655 A1 | * | 9/2018 | Yamaguchi | F16H 57/0484 |
| 2018/0283527 A1 | * | 10/2018 | Sasaki | F16H 57/0426 |
| 2019/0229582 A1 | * | 7/2019 | Ito | F16H 57/0441 |

FOREIGN PATENT DOCUMENTS

| | | | | |
|---|---|---|---|---|
| FR | 2888909 A1 | | 1/2007 | |
| WO | WO-2011101577 A1 | * | 8/2011 | F16H 57/031 |

\* cited by examiner

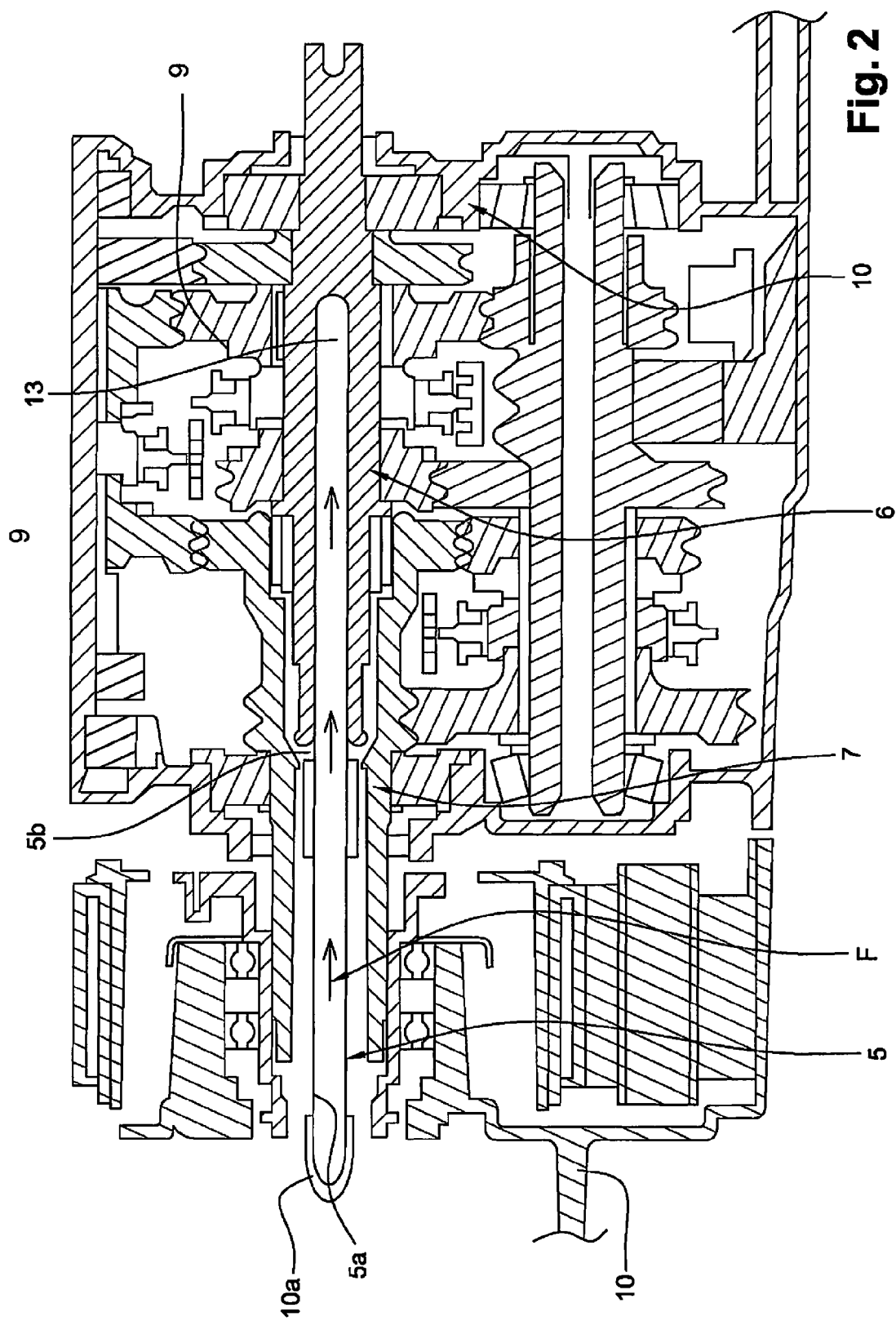

HOLLOW-SHAFT LUBRICATING DEVICE, AND TRANSMISSION COMPRISING A STATIONARY FEEDING CANNULA

CROSS-REFERENCE TO RELATED APPLICATIONS

This application is a U.S. national stage application of International Application No. PCT/FR2017/050227, filed on Feb. 2, 2017, which claims priority to French Patent Application No. 1652013, filed on Mar. 10, 2016.

BACKGROUND

Field of the Invention

The present invention is concerned with the lubrication of a hollow shaft and of a set of transmission pinions.

More precisely, it relates to a device for lubricating a transmission through a hollow shaft inside the case of the transmission, comprising a stationary feeding cannula which extends inside the hollow shaft toward targeted lubrication points of the transmission.

The invention also relates to a transmission comprising a hollow primary shaft and a solid primary shaft which are concentric.

Background Information

Transmissions are generally lubricated by an oil bath. The lubricant is projected in the whole transmission by rotating mechanical elements of the transmission, in particular by the crown wheel of the differential. The pinions are lubricated by direct projection. The shafts are often hollow, the oil then circulating inside the latter.

The presence of an additional electric machine increases the total height of a hybrid transmission in relation to the conventional transmissions. Under these conditions, it may be difficult for the oil to be projected over the whole height of the transmission, especially at low speed. The projection of oil inside the transmission is then no longer sufficient to meet the requirements of lubrication.

Publication FR 2 877 065 discloses a device for the forced lubrication of gearwheels, comprising a stationary feeding cannula housed inside a hollow shaft and pierced with lubrication holes targeted on the pinions.

SUMMARY

It has been found that in certain hybrid architectures, the adopted arrangement to simultaneously ensure the input of movement from a combustion engine and from an electric traction machine to the primary line of the transmission is to force-fit two concentric shafts, with them being respectively fixed to the combustion engine and to the electric machine. When the two drive sources are arranged at the two ends of the primary line, there is no longer an opening available to make oil enter a lubrication cannula.

The present invention is aimed at ensuring the interior lubrication of a hollow shaft of a transmission when the ends of this shaft are not accessible from inside the transmission, in order to introduce the oil into a forced feeding cannula.

Accordingly, it proposes that the inlet of the cannula receives the oil from an external lubrication circuit through an opening in the case.

In one specific embodiment of the invention, the hollow shaft encloses a solid shaft concentric thereto which bears pinions and has an interior drilling in sealed connection with an outlet of the cannula.

The transmission proposed by the invention comprises such a lubrication device.

This solution is applicable for lubricating any hollow shaft of which the inlet is not easily accessible. However, it finds a preferred application in hybrid transmissions with force-fitted primary shafts connected to the combustion engine and to an electric machine.

BRIEF DESCRIPTION OF THE DRAWINGS

The present invention will be better understood on reading the following description of a nonlimiting embodiment thereof with reference to the appended drawings, in which:

FIG. 2 is a partial cross section of the transmission.

BRIEF DESCRIPTION OF THE DRAWINGS

Figure 1A:
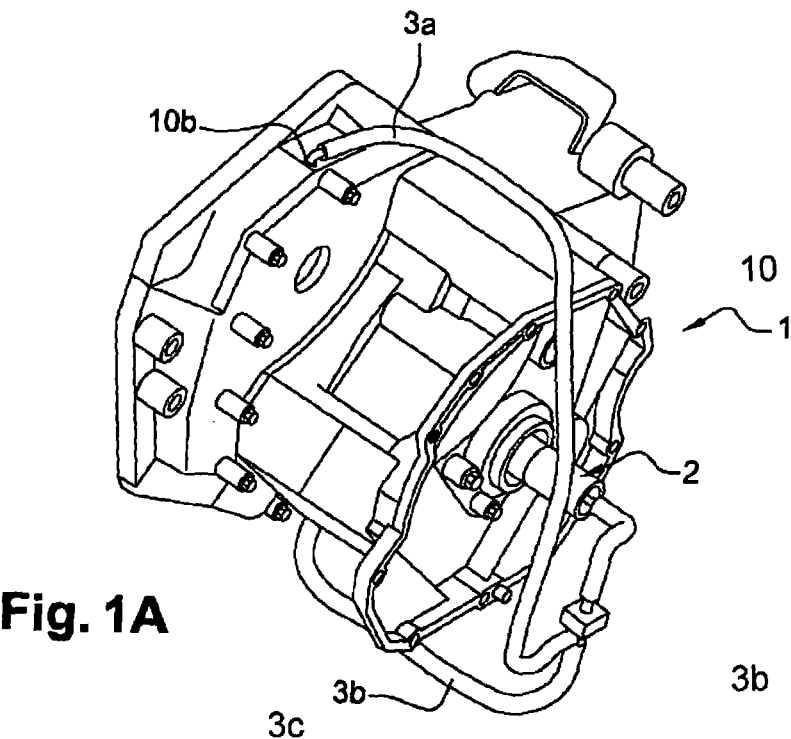
FIGS. 1A and 1B are two exterior overall views of the same transmission, in different orientations.
Figure 1B:
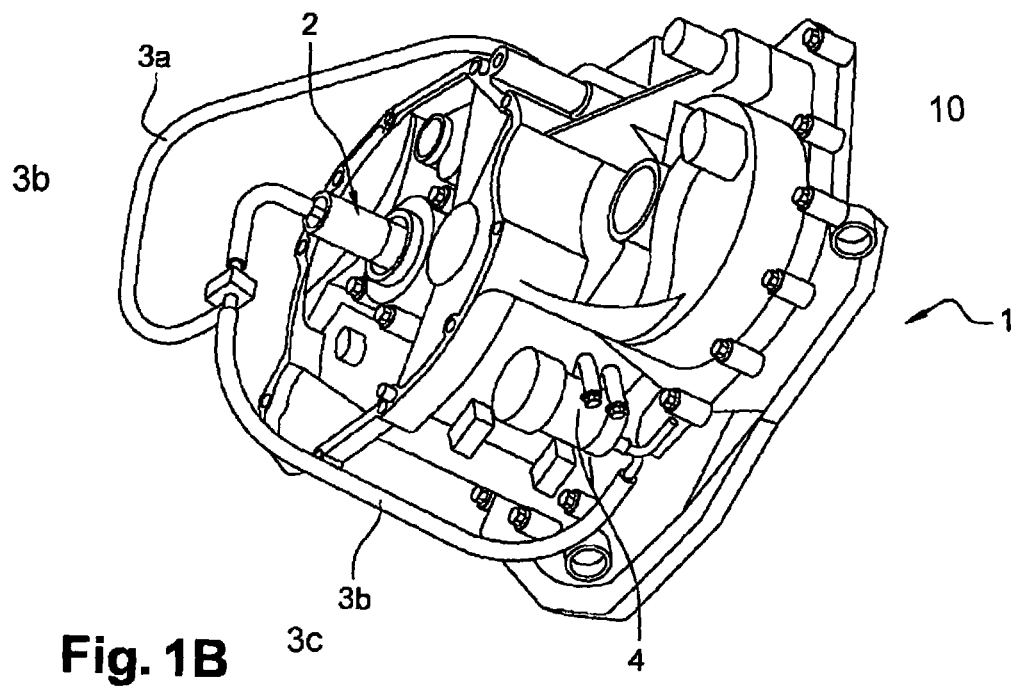

The lubrication system illustrated by FIGS. 1A and 1B makes it possible to bring the desired oil quantity inside the primary line 2 of the transmission 1 by means of an external circuit that includes two ducts: a first duct 3a at the top part of the transmission, and a second duct 3b at the level of the primary line 2. An external pump 4 circulates the oil in this external circuit, outside the transmission 1. The external pump 4 is connected to the first and second ducts 3a, 3b by a third duct 3c. It circulates oil contained in the lower part of the transmission 1. This pump 4 is preferably electric in order that it can be easily controlled as a function of the rotational speed of the various shafts and of the lubrication needs.

The transmission 1 thus has an oil inlet 10b in the upper part and another oil inlet at the level of its primary line. The external circuit comprises the pump 4, which circulates oil contained in the lower part of the transmission 1, and the first and second ducts 3a, 3b: the second duct 3b connected to the inlet 5a of the cannula and the first duct 3a connected to the oil inlet 10b of the transmission 1 that is higher than the hollow shaft 7. In the nonlimiting example which is described, the pump 4 is situated outside the case 10. Within the scope of the invention, it may also be located inside the transmission 1.

The same transmission 1, in cross section in FIG. 2, comprises a solid primary shaft 6 and a hollow primary shaft 7 which are concentric. The proposed lubrication device comprises a cannula 5 of which the end also appears in FIGS. 3A and 3B. The cannula 5 makes it possible to bring the oil from outside the transmission toward the interior of the shafts 6 and 7 to be lubricated. The inlet 5a of the cannula 5 receives the oil from the external lubrication circuit through an opening 10a in the case 10.

The two shafts 6, 7 are the concentric primary shafts of the transmission 1, connected respectively to the combustion engine and to an electric machine (which are not shown). The proposed device is intended to lubricate the transmission 1 through the hollow shaft 7 inside the case 10 of the transmission 1: this device comprises the stationary feeding cannula 5 which extends inside the hollow shaft 7. The solid shaft 6 has an interior longitudinal drilling or bore 13 which follows on from the cannula 5. The drilling or bore 13 is in sealed connection with the cannula 5 and has targeted lubrication holes 8, situated for example below the gear pinions 9. The holes 8 are visible in FIGS. 3A and 3B. The cannula 5 is fixed to the case 10 of the transmission 1. It is engaged inside the hollow shaft 7.

Figure 3A:
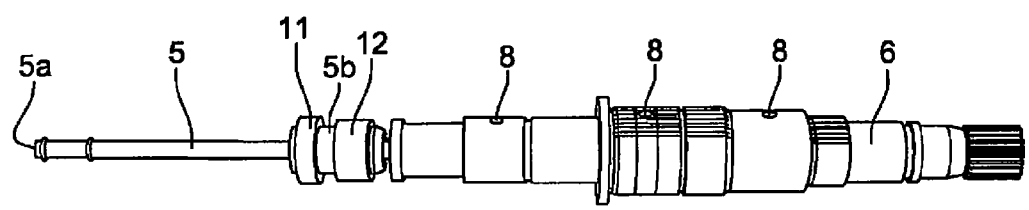
FIGS. 3A and 3B show the solid shaft and the hollow shaft of the transmission with the cannula.
Figure 3B:
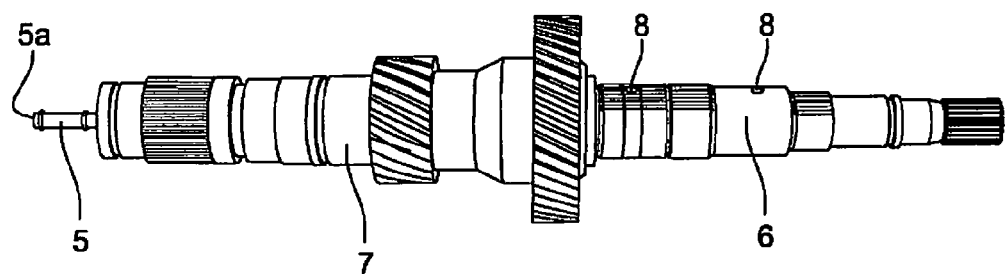

FIG. 3A shows the cannula 5 and the solid shaft 6, without the hollow shaft. FIG. 3B shows the hollow shaft 7 which partially covers the cannula 5 and the solid shaft 6. The outlet end 5b of the cannula 5 facing the longitudinal drilling 13 of the solid shaft 6 is open in order that the oil penetrates into the solid shaft 6. The end 5b of the cannula 5 bears a seal 11 and a guide bearing 12 in the hollow shaft 7 which connect the cannula 5 to the latter.

As indicated above, the cannula 5 is supplied with oil by the pump 4 by virtue of the second duct 3b. The inlet 5a of the cannula 5 receives the oil from the exterior lubrication circuit by means of this second duct 3b through the opening 10a in the case 10. The pump 4 simultaneously supplies the first duct 3a to lubricate the top part of the transmission 1, and the second duct 3b to supply the cannula 5 such that the oil flows through the cannula 5 and the drilling or bore 13 as indicated by arrows F. This double supply makes it possible to optimize the global lubrication of the whole transmission. The channeling of the oil to targeted lubrication points makes it possible to optimize the mechanical efficiency of the transmission. By bringing the oil directly to the locations where it is necessary, it is possible in effect to lower the total oil quantity necessary in the transmission. The reduction in the oil volume reduces the friction in the transmission and improves its efficiency.

The invention claimed is:

1. A hollow shaft lubricating system for lubricating a transmission through a hollow shaft disposed inside a case of the transmission, the hollow shaft lubricating system comprising:
   an external lubrication circuit in fluid communication with an opening in the case; and
   a stationary feeding cannula which extends inside the hollow shaft toward targeted lubrication points of the transmission,
   the cannula having an inlet for receiving oil from the external lubrication circuit through the opening in the case and the cannula having an outlet in sealed connection with an interior bore of a solid shaft that is concentrically disposed in the hollow shaft, the solid shaft supporting pinions,
   the external lubrication circuit comprising a pump which circulates the oil contained in a lower part of the case of the transmission.

2. The hollow shaft lubricating system as claimed in claim 1, wherein
   the external lubrication circuit comprises a first duct fluidly connected to the inlet of the cannula, and a second duct fluidly connected to an inlet point of the transmission that is higher than the hollow shaft.

3. The hollow shaft lubricating system as claimed in claim 1, wherein
   the pump is situated outside the case.

4. The hollow shaft lubricating system as claimed in claim 1, wherein
   the solid shaft has holes for the lubrication of the pinions on the solid shaft.

5. The hollow shaft lubricating system as claimed in claim 1, wherein
   the cannula has an end that is disposed adjacent the solid shaft and that supports a seal and a guide bearing inside the hollow shaft, the guide bearing connects the cannula to the hollow shaft.

6. A transmission comprising:
   a case having an opening;
   a hollow shaft disposed in the case;
   a solid shaft that is concentrically disposed in the hollow shaft; and
   a hollow shaft lubricating system comprising:
      an external lubrication circuit in fluid communication with the opening in the case,
      a stationary feeding cannula which extends inside the hollow shaft toward targeted lubrication points of the transmission, the cannula having an inlet for receiving oil from the external lubrication circuit through the opening in the case and the cannula having an outlet, and
      the external lubrication circuit comprising a pump which circulates the oil contained in a lower part of the case,
      the solid shaft supporting pinions, and the solid shaft having an interior bore that is in sealed connection with the outlet of the cannula.

7. The transmission as claimed in claim 6, wherein
   the external lubrication circuit comprises a first duct fluidly connected to the inlet of the cannula, and a second duct fluidly connected to an inlet point of the transmission that is higher than the hollow shaft.

8. The transmission as claimed in claim 6, wherein
   the pump is situated outside the case.

9. The transmission as claimed in claim 6, wherein
   the solid shaft has holes for lubrication of the pinions on the solid shaft.

10. The transmission as claimed in claim 6, wherein
   the cannula has an end that is disposed adjacent the solid shaft and that supports a seal and a guide bearing inside the hollow shaft, the guide bearing connects the cannula to the hollow shaft.

* * * * *